(12) United States Patent
Wilson, Jr.

(10) Patent No.: US 8,261,454 B2
(45) Date of Patent: Sep. 11, 2012

(54) TUBING MANIPULATING APPLIANCES FOR USE WITH NUT DRIVING TOOLS

(75) Inventor: David Wilson, Jr., Fort Collins, CO (US)

(73) Assignee: American Power Tool Company, Wellington, CO (US)

( * ) Notice: Subject to any disclaimer, the term of this patent is extended or adjusted under 35 U.S.C. 154(b) by 621 days.

(21) Appl. No.: 12/380,216

(22) Filed: Feb. 25, 2009

(65) Prior Publication Data

US 2010/0212161 A1 Aug. 26, 2010

(51) Int. Cl.
*B23D 21/04* (2006.01)
*B21D 7/04* (2006.01)
(52) U.S. Cl. .............. 30/97; 30/95; 72/115; 81/57.16
(58) Field of Classification Search ............. 30/93, 94, 30/95, 96, 97; 72/115; 81/57.16
See application file for complete search history.

(56) References Cited

U.S. PATENT DOCUMENTS

| | | | | | |
|---|---|---|---|---|---|
| 1,346,505 | A | * | 7/1920 | Mitchell | 81/57.3 |
| 1,614,534 | A | * | 1/1927 | Norton | 81/57.3 |
| 2,672,682 | A | * | 3/1954 | Studebaker | 30/97 |
| 2,699,604 | A | * | 1/1955 | Lngwer et al. | 30/97 |
| 4,171,651 | A | * | 10/1979 | Dacunto | 81/57.29 |
| 4,287,795 | A | * | 9/1981 | Curtiss | 81/57.26 |
| 5,103,699 | A | * | 4/1992 | Brown | 82/73 |
| 5,460,062 | A | | 10/1995 | Wilson, Jr. | |
| 6,029,546 | A | | 2/2000 | Gibson et al. | |
| 6,065,212 | A | * | 5/2000 | Lazarevic | 30/101 |
| 7,311,025 | B1 | | 12/2007 | Wilson, Jr. | |
| 7,513,179 | B2 | | 4/2009 | Wilson, Jr. | |
| 7,721,627 | B2 | * | 5/2010 | Basham et al. | 81/57.14 |
| 7,845,080 | B2 | * | 12/2010 | Nasiell | 30/101 |
| 2005/0076508 | A1 | * | 4/2005 | Green et al. | 30/101 |
| 2005/0081388 | A1 | * | 4/2005 | Konen | 30/228 |
| 2009/0250923 | A1 | * | 10/2009 | Hinz et al. | 285/39 |
| 2010/0212161 | A1 | * | 8/2010 | Wilson, Jr. | 30/97 |
| 2010/0269638 | A1 | * | 10/2010 | Wilson et al. | 81/57.36 |

* cited by examiner

*Primary Examiner* — Hwei C Payer
(74) *Attorney, Agent, or Firm* — Harold A. Burdick (57) ABSTRACT

Interchangeable tubing manipulating appliances for use with nut driving tools are disclosed for tubing manipulation, cutting, bending and the like. The appliances include tubing locating and stabilizing structure and securement for aligning and stabilizing the locating and stabilizing structure at one side of the driving tool adjacent to its nut driving head. A rotatable member is engagable at the nut driving head for selective rotation thereof relative to the tubing locating and stabilizing structure. The rotatable member includes a tubing engaging portion and a faceted engagable portion receivable at the nut driving tool. Embodied for tubing cutting, a cutting utility is included mounted adjacent the securement. The rotatable member receives and rotates the tubing. Embodied as a tubing bender, the rotatable member includes a tubing guide end, the locating and stabilizing structure adapted to receive tubing thereat and having an opening for receipt of the rotatable member therethrough.

21 Claims, 10 Drawing Sheets

TUBING MANIPULATING APPLIANCES FOR USE WITH NUT DRIVING TOOLS

FIELD OF THE INVENTION

This invention relates to tools utilized to manipulate connectors and related tubing structures and, more particularly, relates to nut drivers and related tools utilized for installation and maintenance of gas or liquid delivery lines.

BACKGROUND OF THE INVENTION

Powered drivers, both pneumatic and electrical, for manipulation of various types of tools (such as sockets for threaded connectors) are widely utilized. In many applications, such as manipulation of threaded line fittings (i.e., unions or the like) found in all gas or liquid processing or delivery operations and assemblies, correct tightness of the fitting is critical to assure a sound connection and to avoid leakage (which may occur if line fittings are either over or under tightened thus damaging internal ferrules for example). This precision can be adversely impacted by tubing damage and/or deformity.

The tubing used in many types of gas/liquid processing or delivery installations in conjunction with threaded line fittings (sometimes called "swage" fittings) is usually made of steel, is often small diameter but relatively thick walled, and is thus particularly difficult to fabricate (cut, bend and the like) at an installation site. Tools specifically adapted to such fabrication have heretofore been utilized, thus requiring a technician to carry an extensive array of tools in addition to the nut driving tool utilized for line fitting manipulation.

Cutting is an arduous and lengthy process requiring continuous tubing rotation or tubing cutting tool rotation around the steel tubing. Vices have heretofore often been required to hold the tubing during cutting to better assure precision. Even then the cutting process often damages the tubing, including tubing damage encountered at the position of engagement of the tubing in the vice. Moreover, the process is laborious and can cause installation technicians wrist, hand and back pain. Such operations are difficult to accomplish in the field, and thus often require offsite fabrication, a process which requires multiple trips to the installation or maintenance site and which is prone to fabrication error. Improvements in tubing cutting tools and techniques could thus be utilized.

Tubing bending is also arduous and time consuming, some installations requiring multiple intricate tubing bends in advance of the line fitting. Tubing damage is common during such fabrication. On site fabrication is difficult, time consuming and laborious utilizing heretofore known tubing bending tools and techniques. Improvement of such bending tools and techniques could thus also be utilized.

SUMMARY OF THE INVENTION

This invention provides tubing manipulating appliances for use with standard nut driving tools, and in particular provides such appliances for tubing cutting and/or bending. The appliances reduce the tool load required to be carried by a technician at an installation site, are compact and light weight, stable in operation, and easily adapted to a variety of driver types. The appliances reduce or eliminate the amount of off-site fabrication needed for most installations, make quick work of most fabrication operations, and reduce technician injury risk.

The appliances of this invention are interchangeable (both in terms of tubing operation types such as cutting or bending and in terms of tubing size) and are operable in conjunction with a driving tool having a nut driving head. The appliances include tubing locating and stabilizing structure and securement for aligning and stabilizing the locating and stabilizing structure at one side of the driving tool adjacent to the nut driving head. A rotatable member is engagable at the nut driving head for selective rotation thereof relative to the tubing locating and stabilizing structure. The rotatable member provides in itself a separate useful appliance and includes a tubing engaging portion adapted to manipulate tubing received thereat in a selected manner and a faceted engagable portion receivable at the nut driving tool.

The tubing manipulating appliance of this invention adapted for tubing cutting more particularly includes a tubing cutter including a selectively locatable cutting utility mounted adjacent the securement. The rotatable member is configured as a tubing rotation socket engagable at the nut driving head for selective rotation relative to the tubing cutter. The socket receives tubing thereat and holds the tubing for selective rotation thereof in at least one direction of rotation.

The tubing manipulating appliance of this invention configured for tubing bending has the rotatable member configured for a different tubing manipulation and includes a socket end receivable at the nut driving head of the driving tool and a tubing guide end for receipt of tubing thereat. The tubing locating and stabilizing structure is adapted to receive tubing thereat and has an opening for receipt of the rotatable member therethrough.

The cutting appliance adaptation of the present invention preferably utilizes one way roller clutches to grip and thus rotate tubing presented at the cutter. As configured, an exact centerline is maintained relative to the driving tool while cutting operations are performed.

It is therefore an object of this invention to provide tubing manipulating appliances for use with standard nut driving tools.

It is another object of this invention to provide tubing manipulating appliances for use with nut driving tools that are interchangeable both in terms of tubing operation types, such as cutting or bending, and in terms of tubing size.

It is still another object of this invention to provide tubing cutting and/or bending appliances for use with nut driving tools.

It is yet another object of this invention to provide tube cutting and/or bending appliances for use with nut driving tools that are simple to operate, that are self aligning, that are adaptable to a variety of tool types, that cover a range of tubing sizes, and that manipulate tubing with minimum tubing damage, scratch or imperfection.

It is another object of this invention to provide tubing cutting and/or bending appliances for use with nut driving tools that reduce the tool load required to be carried by a technician at an installation site, that are compact and light weight, that are stable in operation in conjunction with the driver, and that are easily adapted to a variety of driver types.

It is still another object of this invention to provide on-site tubing cutting and/or bending appliances for use with nut driving tools to thus reduce off-site fabrication needed for most installations and simplify and hasten most fabrication operations.

It is yet another object of this invention to provide tubing cutting and/or bending appliances for use with nut driving tools that enhance reduction of technician injury risk.

It is still another object of this invention to provide an interchangeable tubing manipulating appliance operable in conjunction with a driving tool having a nut driving head that includes a tubing locating and stabilizing structure, means for aligned securement of the locating and stabilizing structure at one side of the driving tool and adjacent to the nut driving head, and means engagable at the nut driving head for selective rotation thereof relative to the tubing locating and stabilizing structure.

It is yet another object of this invention to provide a tubing manipulating appliance for tubing cutting in association with a nut driving tool having a nut driving head that includes a tubing cutter including a selectively locatable cutting utility mounted adjacent structure for aligned securement of the cutter at one side of the driving tool, and a tubing rotation socket engagable at the nut driving head for selective rotation thereof relative to the tubing cutter, the socket configured to receive tubing thereat and hold the tubing for selective rotation thereof in at least one direction of rotation.

It is another object of this invention to provide a tubing manipulating appliance for tubing bending in association with a nut driving tool having a nut driving head that includes a tubing manipulator having a socket end receivable at the nut driving head of the driving tool for selected rotation of the manipulator and a tubing guide end for receipt of tubing thereat, and a tubing locating and stabilizing structure securable at the driving tool adapted to receive tubing thereat, the structure having an opening for receipt of the manipulator therethrough.

It is yet another object of this invention to provide a tubing manipulating appliance for selected rotation by a nut driving tool that includes a tubing engaging portion adapted to manipulate tubing received thereat in a selected manner, and a faceted engagable portion associated with the tubing engaging portion for common rotation therewith in at least a first direction, the engagable portion receivable at the nut driving tool.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
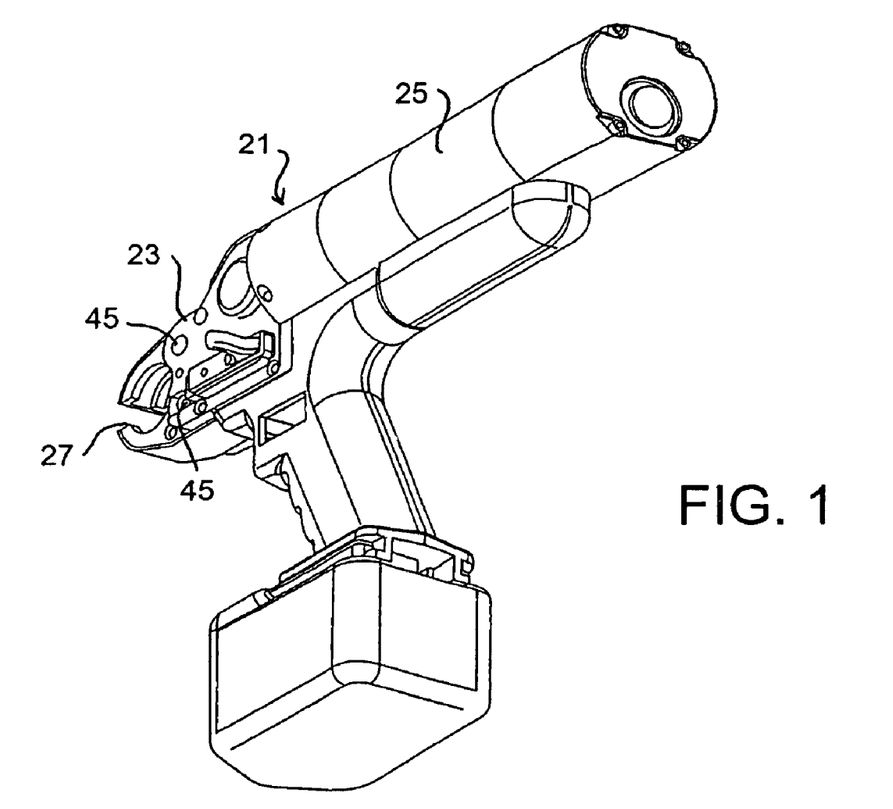
FIG. 1 is a perspective view of one type of nut driving tool with which the appliances of this invention can be utilized.
Figure 2:
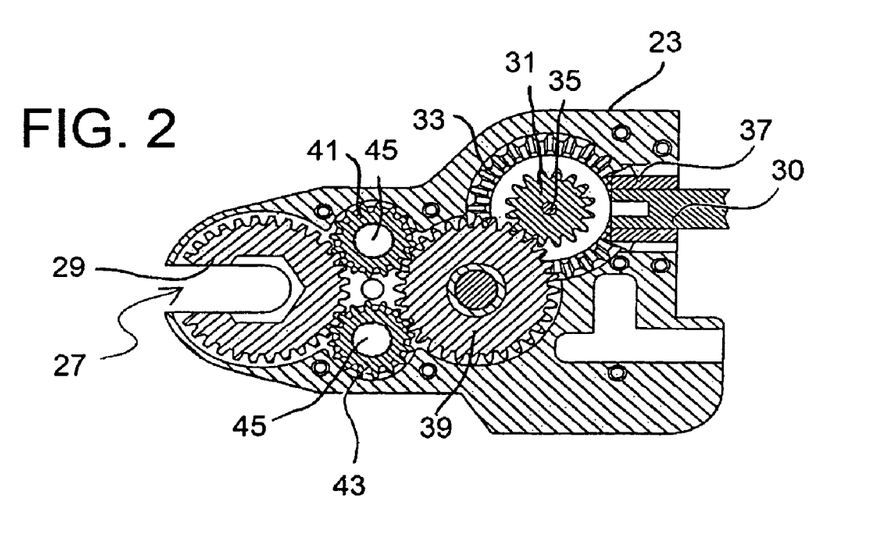
FIG. 2 is a partial sectional view of the nut driving head of the tool of FIG. 1.

FIGS. 1 and 2 are provided for background. These show one type of nut driving tool in association with which the appliances of this invention can be utilized. It should be appreciated that the appliances of this invention can be adapted for securement at and use with almost any driver type while still providing the advantages as shown and described.

The powered driving tool 21 shown in FIGS. 1 and 2 is utilized for rotating sockets or the like to manipulate threaded connectors such a line fitting nuts. Driving tool 21 includes a driving head 23 connected with a motor module 25 and various electronics, switching and power units as are known. As shown in FIG. 2, head 23 has gapped jaw 27 accommodating use of a split socket driver 29 (a hex socket driver, for example) used commonly heretofore to manipulate line fittings, and herein utilized to engage and drive the appliances of this invention. As shown in FIG. 2, power is translated from output shaft 30 of motor module 25 by a drive translate assembly including stacked gears 31 and 33 on shaft 35, bevel gear 33 engaged by primary drive output gear 37 of the final output stage of motor module 25.

Main drive gear 39 and idler gears 41 and 43 having center openings 45 complete the drive train. Center openings 45 provide a convenient mechanism for securement and selective positioning of the appliances of this invention for use on a driver of this type, and the appliances will be illustrated accordingly. It should be appreciated, however, that drivers having different configuration can still utilize the appliances of this invention with adaptation of the securement as may be necessary and apparent.

Turning now to FIGS. 3 through 8, tubing cutting embodiment 49 of the appliance of this invention is illustrated for cutting of tubing 51. Cutting appliance 49 includes tubing locating and stabilizing structure 53 (in this embodiment a tubing cutter) including a housing block 54, securement 55 for aligning and securing structure 53 at one side of driving tool 21 adjacent to driving head 23, and rotatable structure 57 engagable at nut driving head 23 by socket driver 29 for rotation thereof relative to structure 53. Rotatable structure 57 (in this embodiment functioning as a tubing rotation socket) includes tubing engaging portion 59 for manipulating tubing in a selected manner (in this embodiment, rotating the tubing in at least a first direction), and faceted engagable portion 61 (preferably a hexagonal socket structure) engagable at socket driver 29.

Securement 55 for this particular driving tool is an assembly including guide rails 63 (rod shaped splines) slidably receivable through openings 45 through idler gears 41 and 43 and threadably engaged at the opposite ends thereof at alignment block 65. Alignment block 65 is slidably received in elongated slide opening 67 of housing block 54 with collar 69 thereof protruding through restricted slot 70 of opening 67 and rim 71 thereof restrained by slot opening wall 73. At least one of rails 63 may be provided with means for maintaining securement 55 at driving tool 21 (in this case circumferential groove 75 engagable at a driving head retainer).

Figure 6:
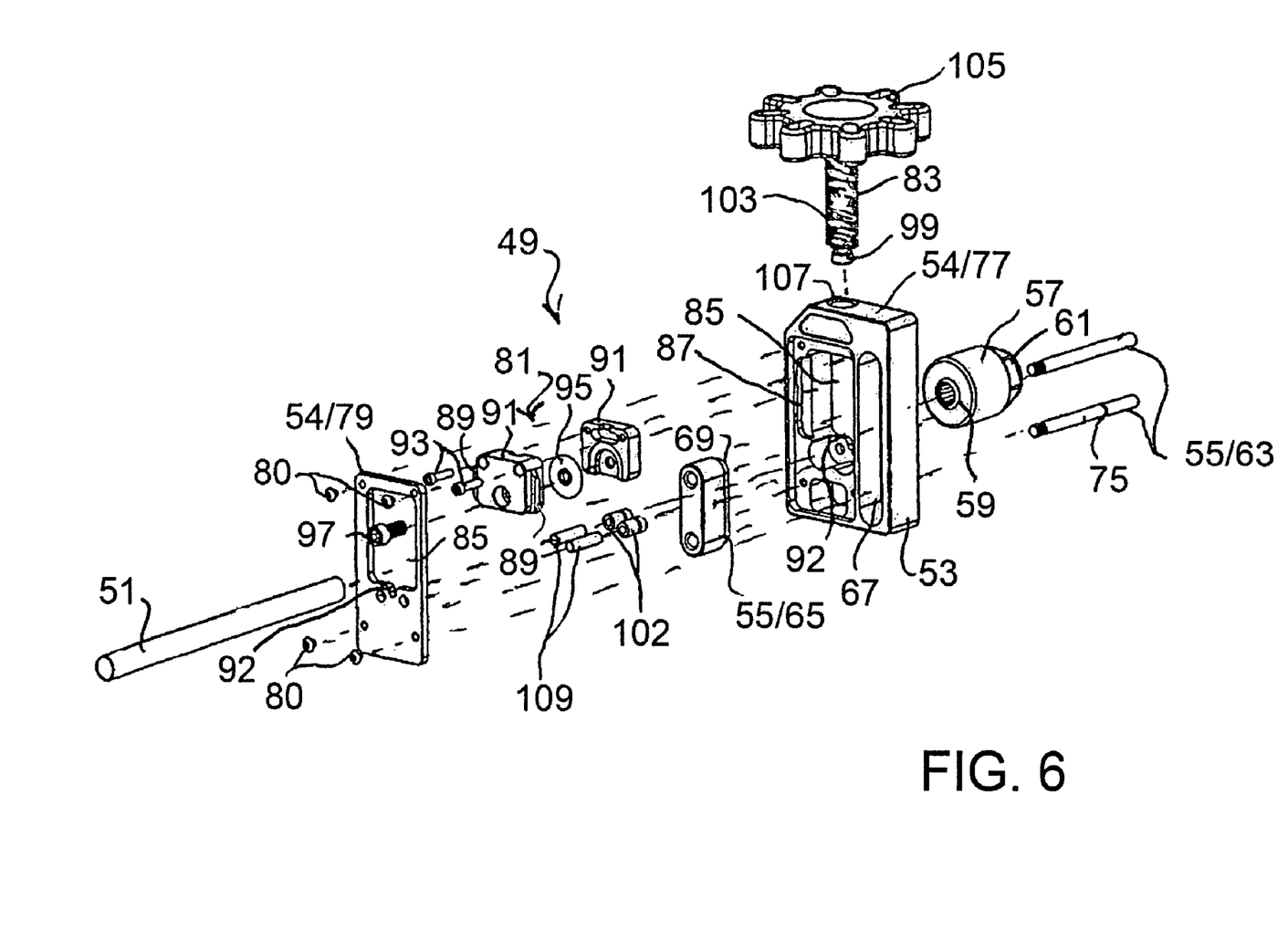
FIG. 6 is an exploded view of the appliance of FIG. 3.

As best shown in FIG. 6, housing block 54 includes body portion 77 and cover portion 79 held together by screws 80.

Tubing cutting utility 81 is selectively locatable by user manipulable threaded positioner 83 in cavity 85 (an opening through both body portion 77 and cover portion 79) of housing block 54. Cavity 85 has a cutting utility receiving track 87 (see also FIG. 4) at the sides thereof for slidable receipt of guides 89 of blade retaining block 91 of cutting utility 81 therein, and tubing positioning portion 92 at the base thereof (i.e., defined by a detent at the base of cavity/opening 85). Retaining block 91 includes first and second block halves (see FIG. 6) held together by machine screws 93.

Figure 7:
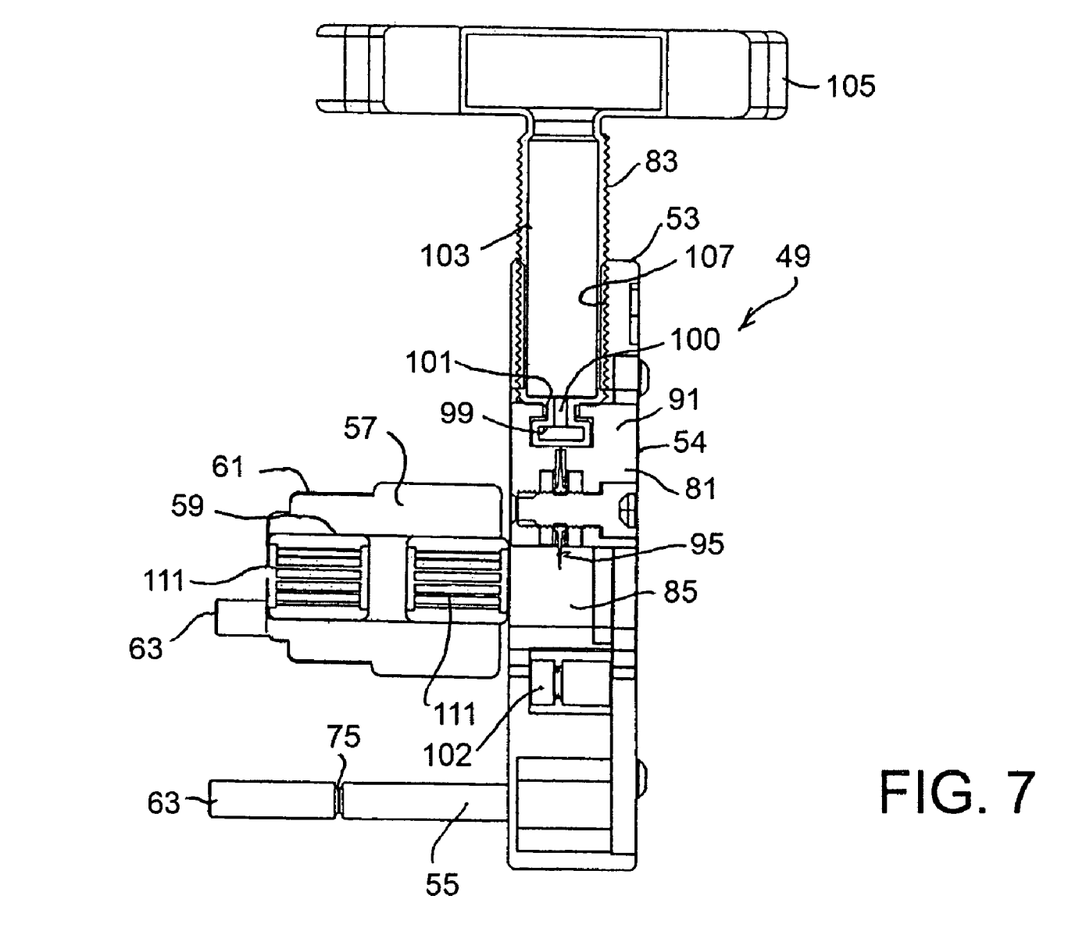
FIG. 7 is a sectional view of the appliance of FIG. 3.

When assembled, cavities defined within block 91 house cutting wheel 95 (a metal cutting blade) rotatably mounted on screw 97, positioner end 99 (on reduced diameter neck 100 retained through opening 101—see FIG. 7), and rollers 102 adjacent to tubing positioning portion 92. Positioner 83 includes threaded shaft 103 having end 99 at one terminus and manually manipulable portion 105 at an opposite terminus, shaft 103 threadably engaged at threaded opening 107 in housing block body portion 77. Rollers 102 are rotatably retained on shafts 109 held at between openings in body portion 77 and cover portion 79 and accommodate rotation of tubing received at tubing positioning portion 92.

Figure 8:
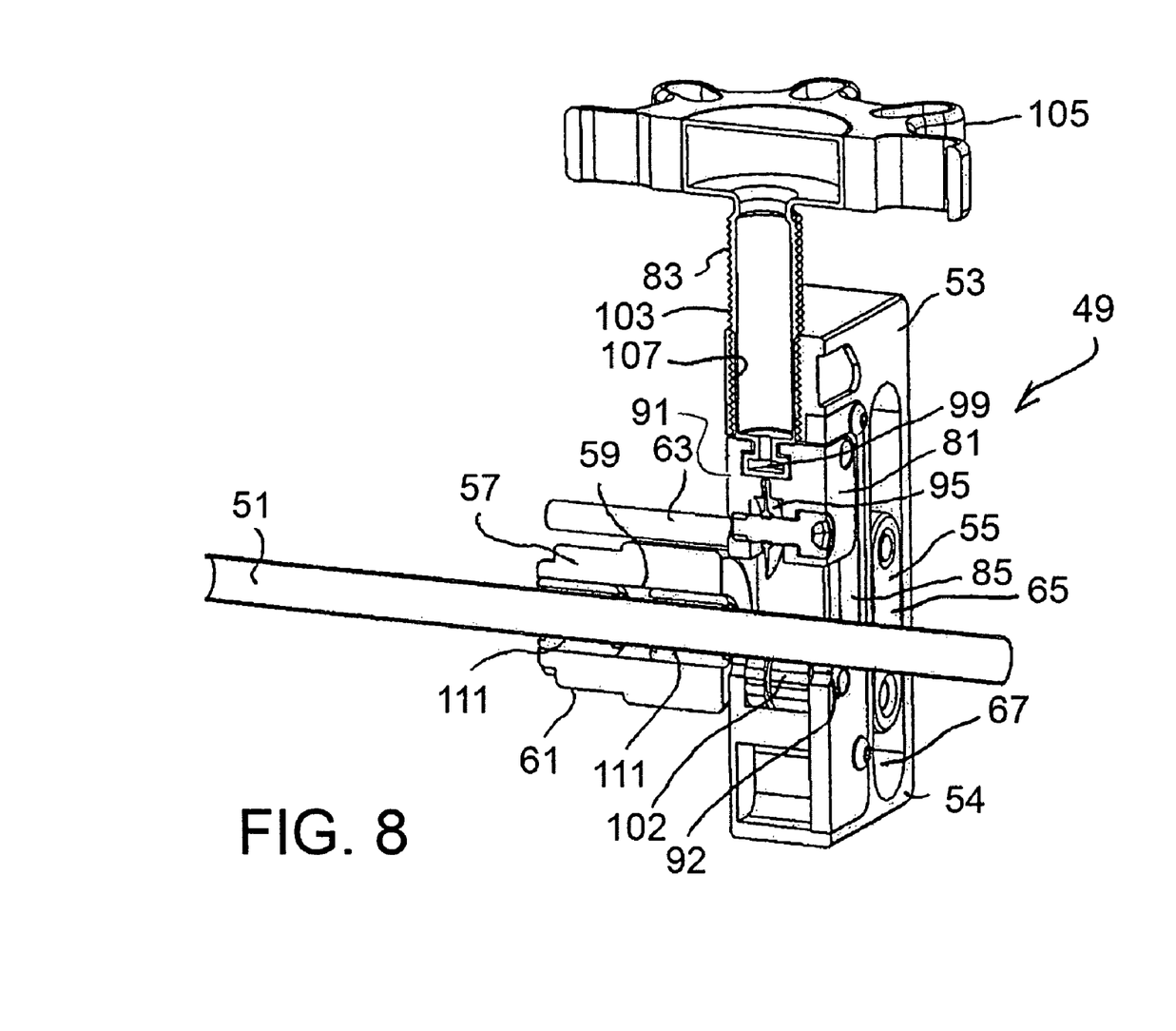
FIG. 8 is a sectional view illustrating tubing position in the appliance of FIG. 3.

As shown in FIGS. 7 and 8, tubing engaging portion 59 of rotatable structure 57 in the cutter embodiment of the appliances of this invention includes at least one and preferably two one-way roller clutch assembly or assemblies 111 (though any other means for slidably receiving tubing therethrough and holding the tubing therein to allow selective rotation of the tubing could be utilized). Use of a single roller clutch assembly provides for rotation of tubing received thereat in one direction of structure 57 rotation, and rotation of structure 57 relative to the tubing in an opposite direction of rotation. Use of a second one-way roller clutch in a back-to-back configuration with the first allows for the driving of tubing rotation in an opposite direction from the first roller clutch assembly, thereby providing tubing rotation in either direction of structure 57 rotation by the nut driving tool. Engagable portion 61 and engaging portion 59 of structure 57 are preferably integrated structures with the engagable portion defined at an outer circumference of the engaging portion. Plural structures 57 may be provided each configured to receive and hold tubing of a different size.

Operation the embodiment 49 of the appliance of this invention is illustrated in FIGS. 3, 4, 7 and 8. Rotatable structure 57 is engaged at faceted engagable portion 61 by socket driver 29 of head 23 of tool 21 and the assembled stabilizing structure 53 and securement 55 of appliance 49 are presented for engagement at tool head 23 as heretofore described. Tubing 51 is received at cavity 85 and through the central opening of engaging portion 59 of structure 57 (through roller clutch assemblies 111) and guide rails 63 are located in openings 45 at head 23. It should be appreciated that the order of assembly is a preference best left to the operator in the field.

Once appliance 49 and tubing 51 are positioned, structure 53 and securement 55 are slidably moved toward head 23 and rotatable structure 57 on rails 63. Once tubing 51 is at its selected cutting position, manipulable portion 105 of positioner 83 is tightened to bring cutting utility 81 into position until the blade of cutting wheel 95 contacts tubing 51. As tightening proceeds, tubing 51 is forced into position at tubing positioning portion 92 in contact with rollers 102, alignment block 65 of securement 55 slidably adjusting along slide opening 67 accommodating tubing positioning. Tubing 51 is then rotated (in either direction) by activation of driving tool 21 as positioner 83 is continually tightened to effect tube cutting. Should binding of any type occur, reverse rotation will alleviate the problem. In this manner, the exact centerline of tubing 51/tool head 23 is maintained during all operations while positioner 83 is tightened and tubing 51 is rotated.

Figure 3:
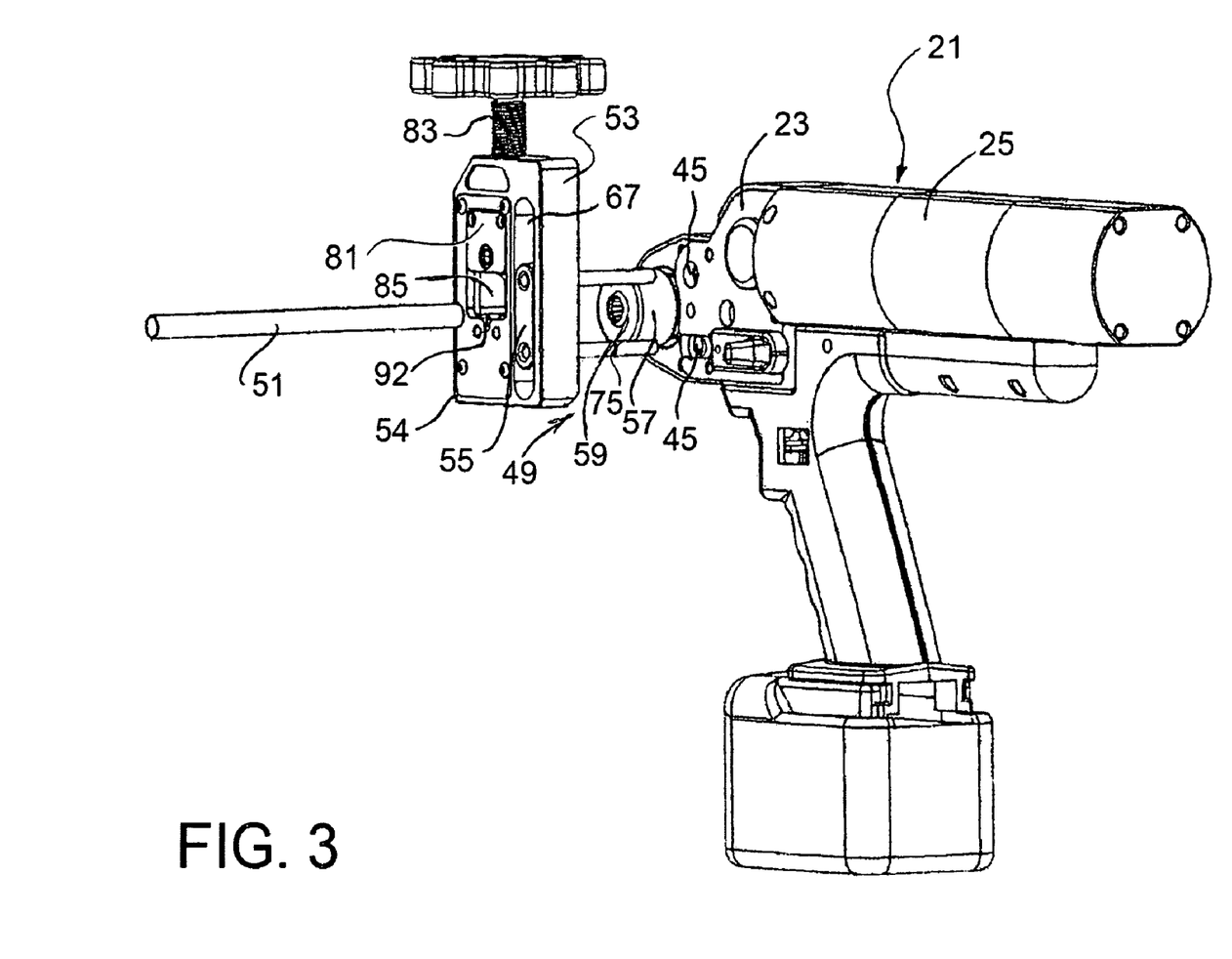
FIG. 3 is a perspective view of one embodiment of the interchangeable appliance (for tube cutting) of this invention.
Figure 4:
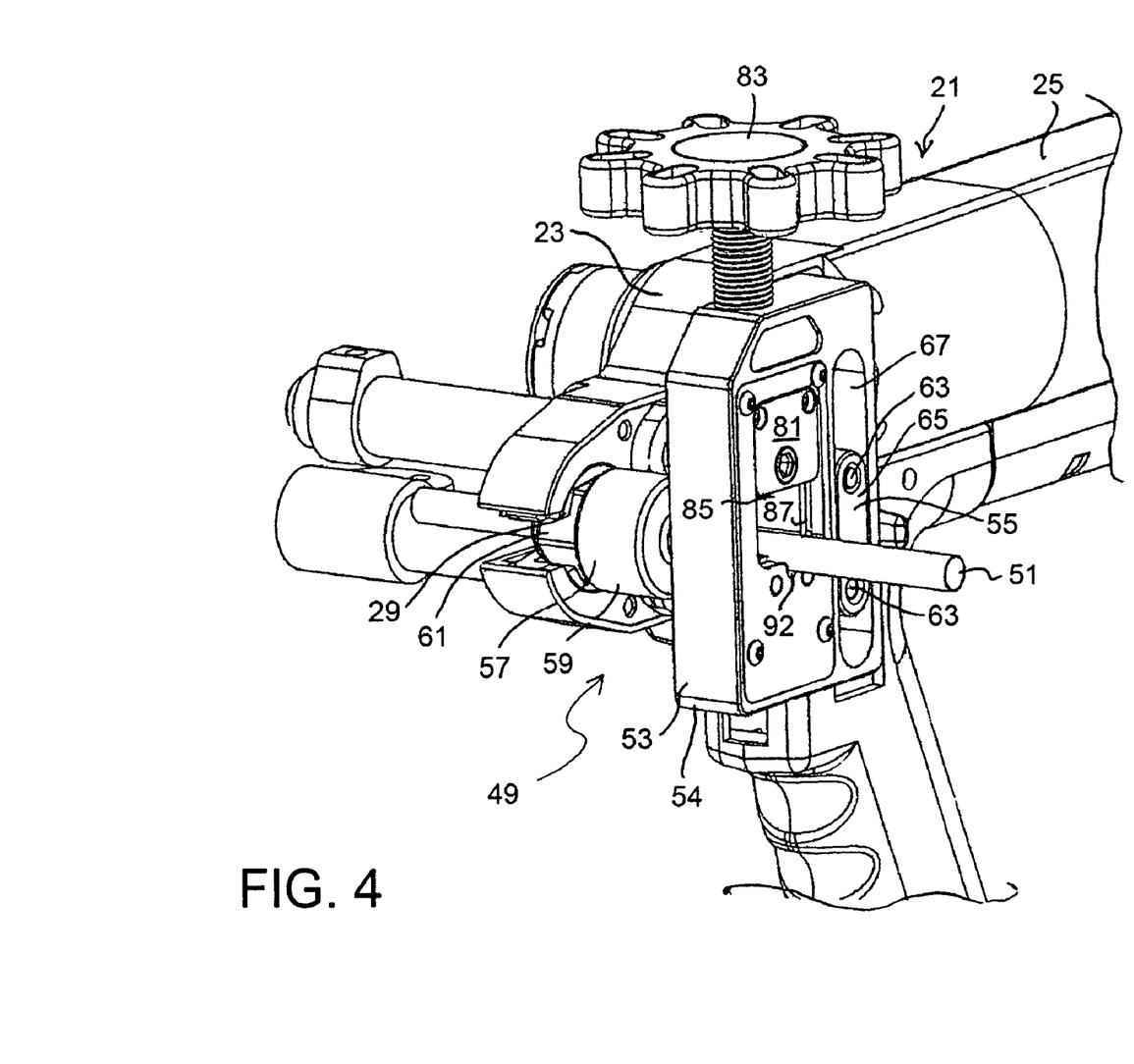
FIG. 4 is a second perspective view of the appliance of FIG. 1 mounted on a nut driving tool and having tubing positioned therein for cutting.
Figure 5:
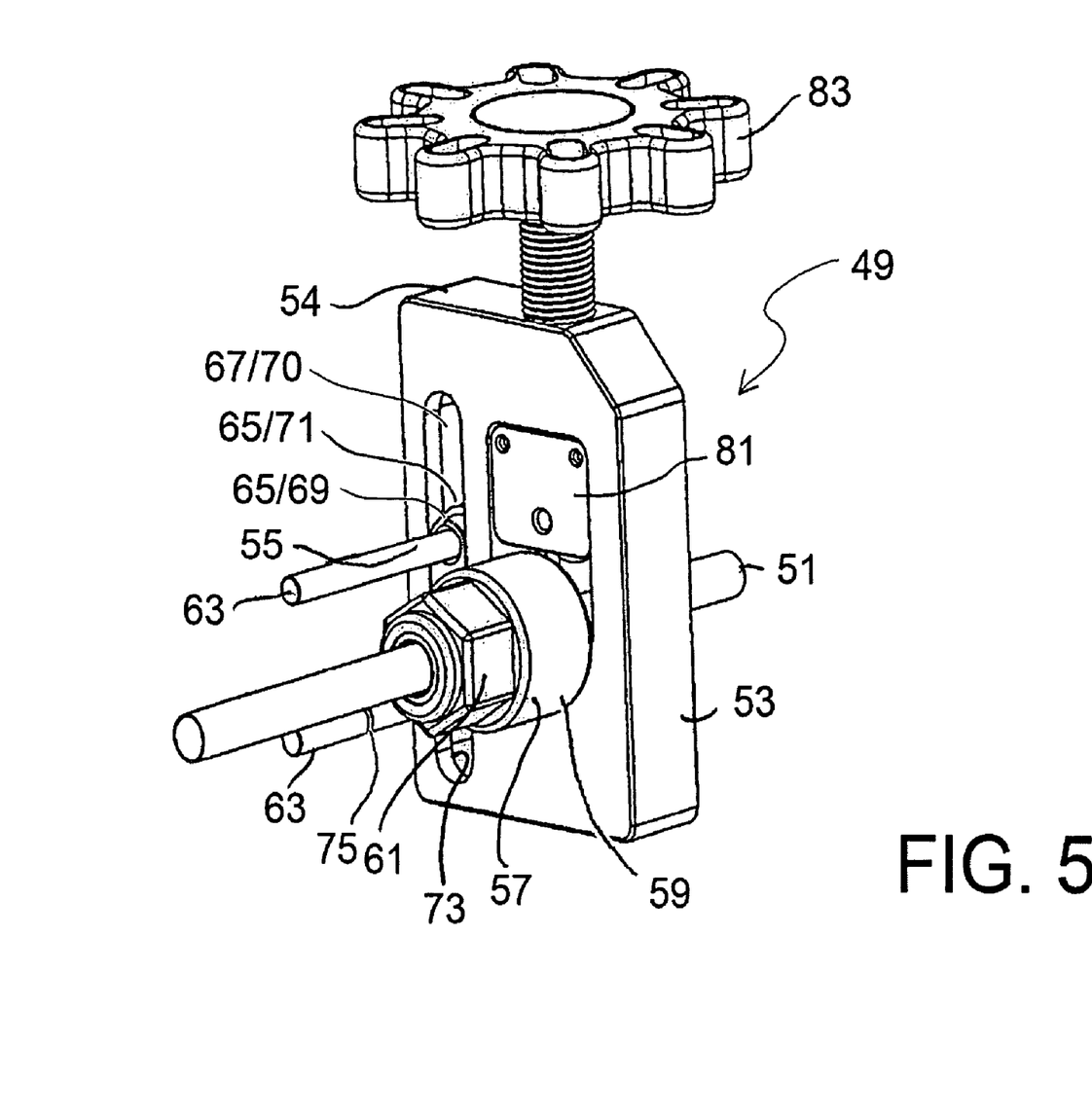
FIG. 5 is another perspective view of the appliance of FIG. 3.

Cutting appliance 49 is simple, self aligning and adaptable to a variety of tool types having a drive head. Appliance 49 covers a range of tubing sizes at rotatable structure 57, and rotates tubing without scratching or otherwise damaging the tubing. Accurate cutting to any desired length can be accomplished in seconds with no torque reaction stress. While roller clutches are preferred herein (providing easy on/off application to tubing 51 and slip free tubing rotation), other means to engage the tubing such as friction material sleeves or the like could be used to grip and rotate tubing without damaging the tubing. Moreover, additional roller clutches (more than one or two and stacked in any direction of free rotation) could be utilized to provide greater tube support.

While not shown, is should be appreciated that simple measuring attachments could be utilized for measuring a length of pipe as it is drawn through stabilizing structure 53 of appliance 49. For example, a wheel with a known diameter and index marks could be used to visually monitor the length of tubing to be cut. A floating block coupled to a spring biased articulated arm attached to stabilizing structure 53 would maintain the measurement wheel on the centerline of tubing 51 while adjustments are made in vertical position of structure 53 on securement 55. The simple wheel could be coupled to an assemblage of gears for registration of feet, inches, and fractions as desired. In the present embodiment the graduated wheel would be useful for determination of the number of inches of tubing being pulled through structure 53, insuring an exact cutting length. Other known means including optical or electronic means could be utilized for measuring tubing length at structure 53 and could be coupled to driving tool 21 onboard central processing controls.

Figure 9:
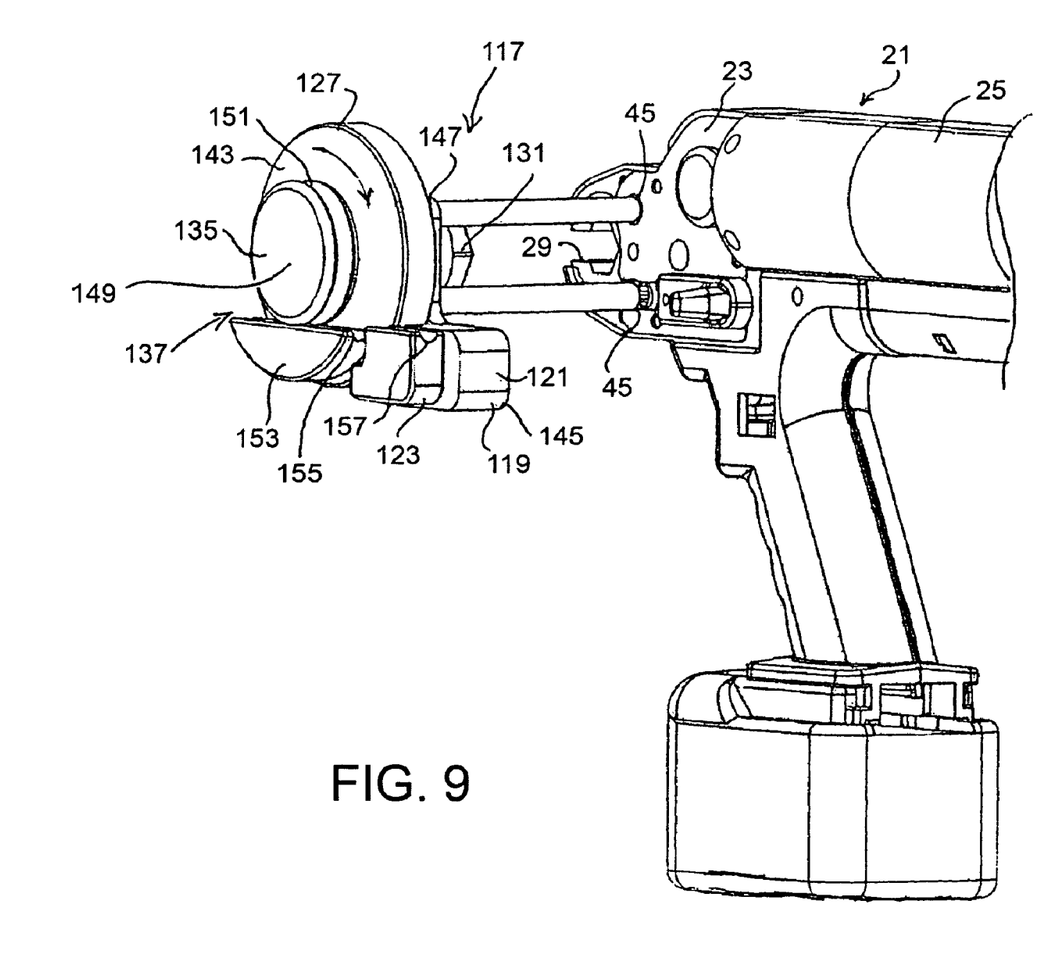
FIG. 9 is a perspective view of another embodiment of the interchangeable appliance (for tube bending) of this invention.
Figure 10:
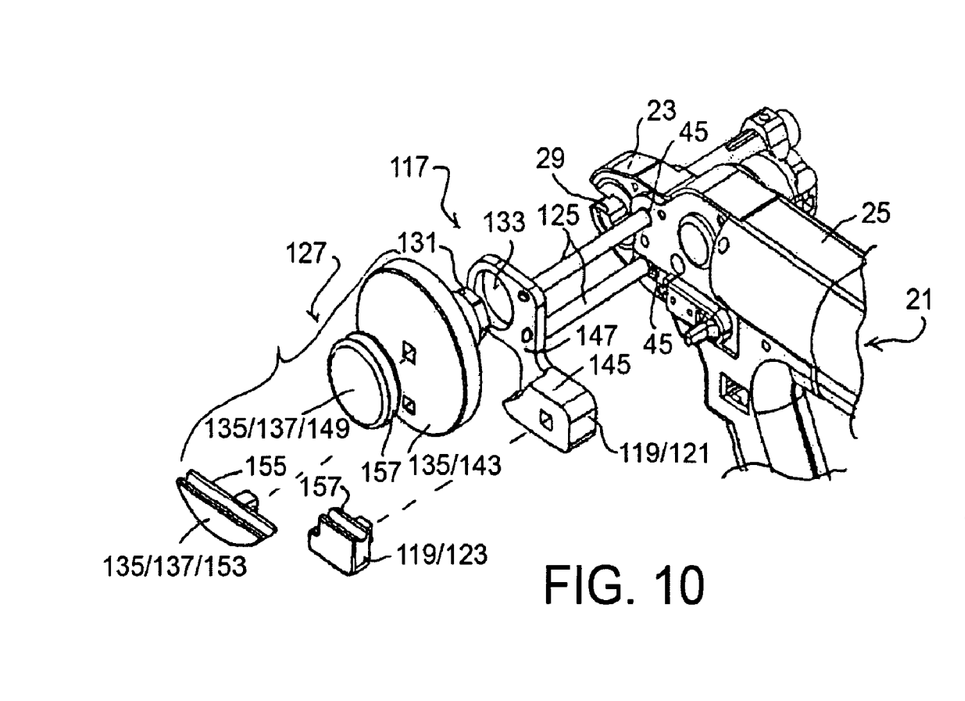
FIG. 10 is an exploded view of the appliance of FIG. 9.
Figure 11:
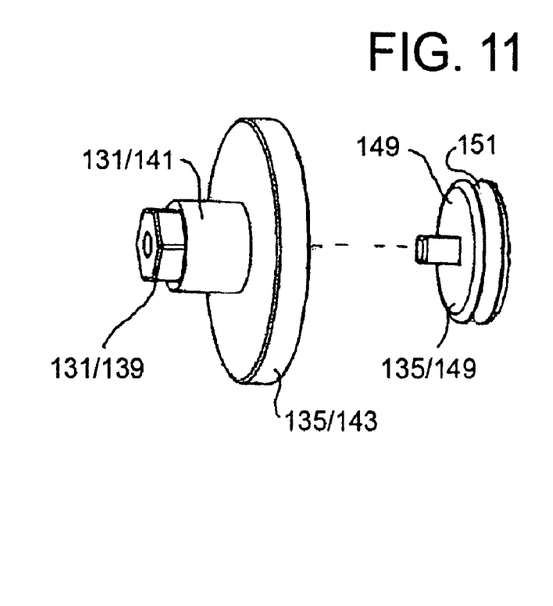
FIG. 11 is a perspective exploded view of portions of the tubing manipulator of the appliance of FIG. 9 including an engagable socket, mounting wheel and part of the tubing guide assembly.

Tubing bending embodiment 117 of the appliance of this invention is illustrated in FIGS. 9 through 11. Bending appliance 117 includes tubing locating and stabilizing structure 119 including manipulator stabilizing assembly 121, tube guide block 123 press fit into engagement with assembly 121, and aligning securement 125 (guide rails, for example) threadably engaged with assembly 121 for aligning and securing structure 119 at one side of driving tool 21 adjacent to driving head 23. Rotatable structure 127 is engagable at nut driving head 23 by socket driver 29 for rotation thereof relative to structure 119. Rotatable structure 127 in appliance embodiment 117 comprises a tubing manipulator including socket end 131 receivable through opening 133 of assembly 121 for engagement at nut driving head 23 of driving tool 21, and tubing guide end 135 for receipt of tubing 51 thereat.

Rotatable structure 127 (in this embodiment functioning as the primary bending agent) includes tubing engaging portion 137 at end 135 for manipulating tubing in a selected manner (in this embodiment, by rotating engaging portion 137 in at least a first direction to bend tubing located thereat). Socket end 131 includes a faceted engagable portion 139 (preferably a hexagonal socket structure) engagable at socket driver 29 and neck portion 141 extending through opening 133. Securement 125 for this particular driving tool includes guide rails slidably receivable at openings 45 through idler gears 41 and 43. Again, at least one of the rails may be provided with means for retaining structure 119 at driving tool 21.

Tubing guide end 135 of rotatable structure 127, including engaging portion 137, includes mounting wheel 143 having neck portion 141 of socket end 131 secured thereto at one face and engaging portion 137 secured (press fitting, for example) at its opposite face. Manipulator stabilizing assembly 121 of structure 119 includes wheel guide block portion 145 integrated with plate portion 147 for stabilizing wheel 143 during rotation. A selected diameter guide 149 (preferably an interchangeable part) of engaging portion 137 is centrally located at the opposite face of wheel 143 and has a circumferential groove 151 therearound of a size selected to accommodate a selected tubing 51 size. Diameter of guide 149 is selected depending on desired bend radius. A second tubing guide 153 is located at the opposite face of wheel 143 spaced from guide 149 and also has a groove 155 of the selected size at a linear extent thereof.

When wheel 143 is rotated to its rest position (ready to receive tubing as shown in FIG. 9), groove 155 of guide 149 is linearly coextensive with linear groove 157 of guide block 123 of structure 119. The spacing between guides 149 and 153 is selected to accommodate a snug, but slidable, fit of the selected tubing 51 size. A tubing to be bent is located at the grooves 151/155/157 and positioned where the bend is to be made. Securement rails 125 are positioned in openings 45 of driving head 23 and the assembled appliance 117 is slid into place with socket end 131 of rotatable structure 127 engaged at socket driver 29. Driving tool 21 is then actuated (rotation in only one direction—the clockwise direction—as shown in FIG. 9) to rotate wheel 143, and thus guides 149 and 153, relative to guide block 123 of structure 119. When the bend is complete, rotatable structure 127 can be released from socket driver 29 and/or rails 125 from head 23 to better accommodate release of the tubing.

As before, the exact centerline of tubing 51/tool head 23 is maintained during all bending operations while wheel 143 is rotated thereby assuring accurate and repeatable bends. Bending appliance 117 is simple, self aligning and adaptable to a variety of tool types having a drive head. Appliance 117 is adaptable to cover a range of tubing sizes at rotatable structure 127, and rotates tubing thereat with minimal scratching or other damage. Again, measuring tools could be adapted and utilized with appliance 117.

It should be appreciated that the particular means for adapting the appliances of this invention to a driving tool, and particularly the means for movement of the appliance toward and away from the driving head while secured to the driver, will be different depending upon driver type and/or in view of other considerations such as space savings, driver size, and desired weight limitations.

Figure 12:
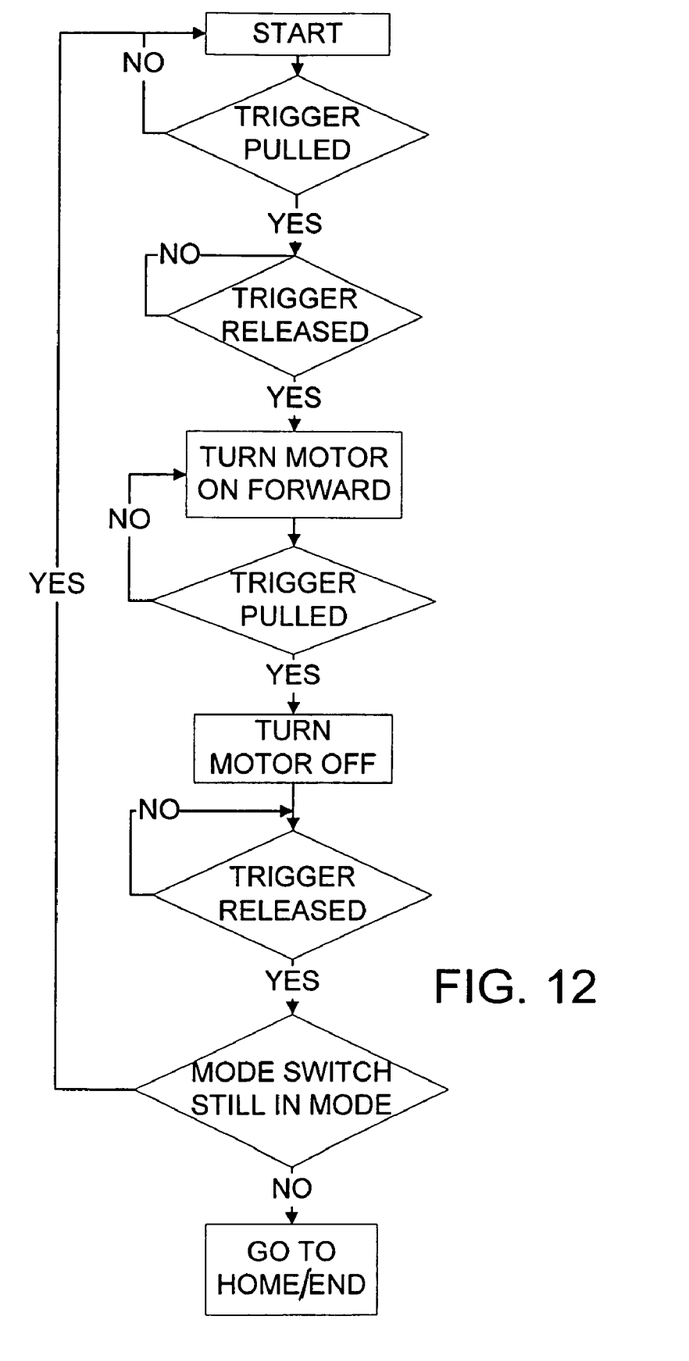
FIG. 12 is a flow chart illustrating programmable control of the appliances of this invention in association with overall driver control programming.

Turning now to FIG. 12, the appliances of this invention can be incorporated into the program control of controllers for driving tools thus equipped. For example, in a typical application, once the driver is powered on it may provide for mode selection between various supported modes. If an auxiliary mode is supported, programming can be applied to support the appliances of this invention. Once programmed, selection of the mode adapted to the particular interchangeable appliance of this invention to be utilized can be initiated by a user (at a mode selection switch, for example). Once entered, the start cycle for the selected mode repeats until the mode is exited (again, by switching for example). Mode functionality may be as simple as monitoring of user operation of the driver via the various power forward, jog, power reverse switches or the like as shown.

What is claimed is:

1. An interchangeable tubing manipulating appliance operable in conjunction with a driving tool having a nut driving head, said appliance comprising:
    tubing locating and stabilizing structure;
    means for aligned securement of said tubing locating and stabilizing structure at one side of the driving tool and adjacent to the nut driving head, said means for aligned securement including means slidably receivable at selected drive tool structure for selected positioning of said tubing locating and stabilizing structure relative to the driving head of the driving tool; and
    means engagable at the nut driving head for selective rotation thereof relative to said tubing locating and stabilizing structure.

2. The interchangeable tubing manipulating appliance operable in conjunction with a driving tool of claim 1 wherein said means engagable at the nut driving head includes a tubing engaging portion adapted for manipulation of tubing in a selected manner and a faceted engagable portion associated with said tubing engaging portion for common rotation therewith in at least a first direction of rotation.

3. The interchangeable tubing manipulating appliance operable in conjunction with a driving tool of claim 1 further comprising a cutting utility mounted at said tubing locating and stabilizing structure, and wherein said means engagable at the nut driving head includes means for slidably receiving tubing therethrough and for holding the tubing therein to thereby allow selective rotation of the tubing.

4. The interchangeable tubing manipulating appliance operable in conjunction with a driving tool of claim 1 wherein said means engagable at the nut driving head for selective rotation thereof includes at least a first one way roller clutch assembly.

5. The interchangeable tubing manipulating appliance operable in conjunction with a driving tool of claim 1 includes means for either one of tubing cutting or tubing bending and adaptable to different tubing sizes.

6. The interchangeable tubing manipulating appliance operable in conjunction with a driving tool of claim 1 wherein said tubing locating and stabilizing structure includes a first tubing guide and wherein said means engagable at the nut driving head includes a second tubing guide fixed at a mounting wheel.

7. A tubing manipulating appliance for tubing cutting in association with a nut driving tool having a nut driving head, said appliance comprising:
    a tubing cutter including a selectively locatable cutting utility mounted adjacent structure for aligned securement of said tubing cutter at one side of the driving tool; and
    a tubing rotation socket engagable at the nut driving head for selective rotation thereof relative to said tubing cutter, said tubing rotation socket configured to receive tubing thereat and hold the tubing for selective rotation thereof in at least one direction of rotation.

8. The tubing manipulating appliance for tubing cutting in association with a nut driving tool of claim 7 wherein said tubing cutter further includes a housing having a tubing positioning portion and a cutting utility receiving portion having said selectively locatable cutting utility selectively positionable therein.

9. The tubing manipulating appliance for tubing cutting in association with a nut driving tool of claim 8 wherein said tubing positioning portion includes a least first means for accommodating rotation of tubing received thereat.

10. The tubing manipulating appliance for tubing cutting in association with a nut driving tool of claim 8 further comprising a user manipulable cutting utility positioner maintained at the housing for selectable location of said selectively locatable cutting utility along said cutting utility receiving portion relative to said tubing positioning portion.

11. The tubing manipulating appliance for tubing cutting in association with a nut driving tool of claim 8 wherein said housing further includes an elongated slide opening and wherein said structure for aligned securement of said tubing cutter includes an alignment block slidably receivable at said elongated slide opening of said housing.

12. The tubing manipulating appliance for tubing cutting in association with a nut driving tool of claim 7 wherein said tubing rotation socket includes at least a first one way roller clutch assembly for receiving tubing therein.

13. The tubing manipulating appliance for tubing cutting in association with a nut driving tool of claim 12 wherein said tubing rotation socket includes a second one way roller clutch assembly receiving the tubing therein and positioned relative to said first one way roller clutch assembly to provide driving rotation in an opposite direction from said first one way roller clutch assembly.

14. The tubing manipulating appliance for tubing cutting in association with a nut driving tool of claim 7 further comprising a plurality of tubing rotation sockets each configured to receive and hold tubing of a different size.

15. The tubing manipulating appliance for tubing cutting in association with a nut driving tool of claim 7 further comprising means for registering tubing length associated with said tubing cutter.

16. A tubing manipulating appliance for selected rotation by a nut driving tool comprising:
   a tubing engaging portion adapted to manipulate tubing received thereat in a selected manner, said tubing engaging portion including a first one way roller clutch allowing rotation of tubing received thereat in one direction of appliance rotation and rotation of said tubing engaging portion relative to the tubing in an opposite direction of appliance rotation; and
   a faceted engagable portion associated with said tubing engaging portion for common rotation therewith in at least a first direction, said faceted engagable portion receivable at the nut driving tool.

17. The appliance of claim 16 includes means for either one of tubing cutting or tubing bending.

18. The appliance of claim 16 wherein said tubing engaging portion includes a second one way roller clutch configured so that tubing received thereat is rotatable in either direction of appliance rotation by the nut driving tool.

19. The appliance of claim 18 wherein said faceted engagable portion and said tubing engaging portion are integrated structures with said faceted engagable portion defined at an outer circumference of said tubing engaging portion.

20. The appliance of claim 16 wherein said tubing engaging portion includes a tubing guide fixed at a mounting wheel.

21. The appliance of claim 20 wherein said tubing guide includes a selected diameter first guide portion centrally located at one face of said mounting wheel and a second guide portion spaced from said selected diameter first guide portion at said one face, said faceted engagable portion centrally located at an opposite face of said mounting wheel.

* * * * *